May 17, 1955  G. A. BUTTRESS  2,708,300
MACHINE FOR FORMING PLASTER KEYING
DEPRESSIONS IN PLASTERBOARD
Filed Aug. 3, 1951  2 Sheets-Sheet 2
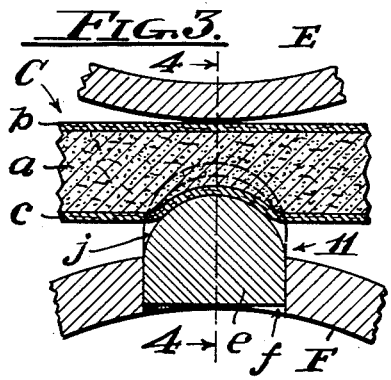
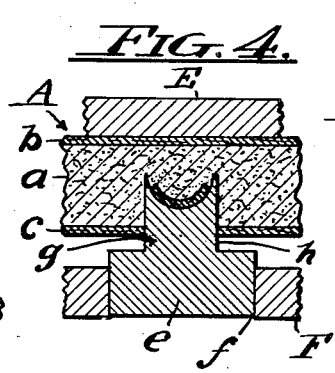
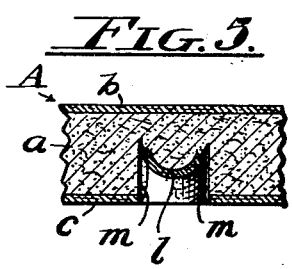
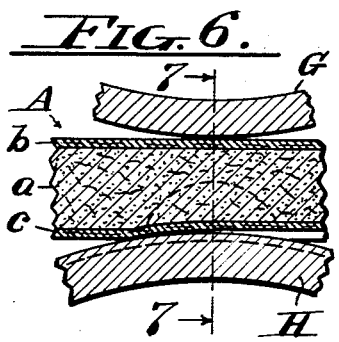
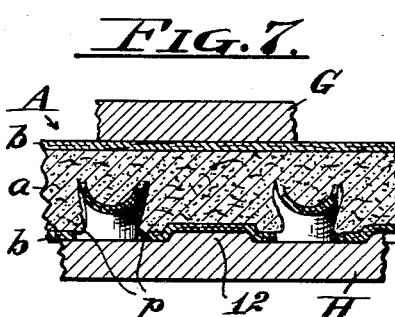
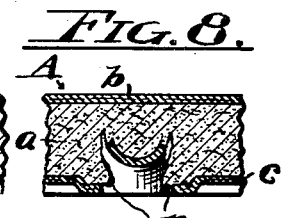
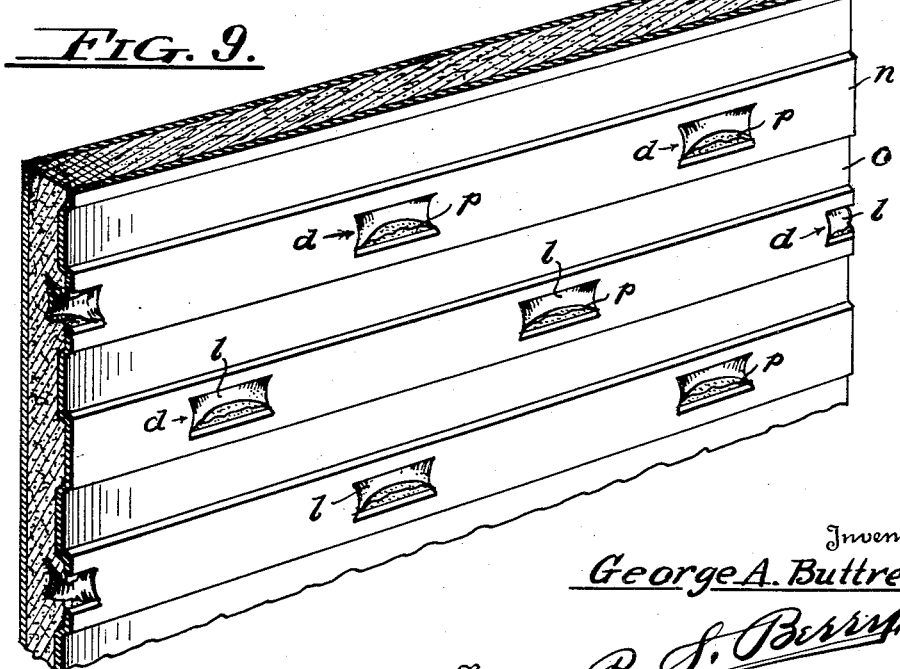
Inventor
George A. Buttress:
By R. S. Berry
Attorney United States Patent Office 2,708,300
Patented May 17, 1955

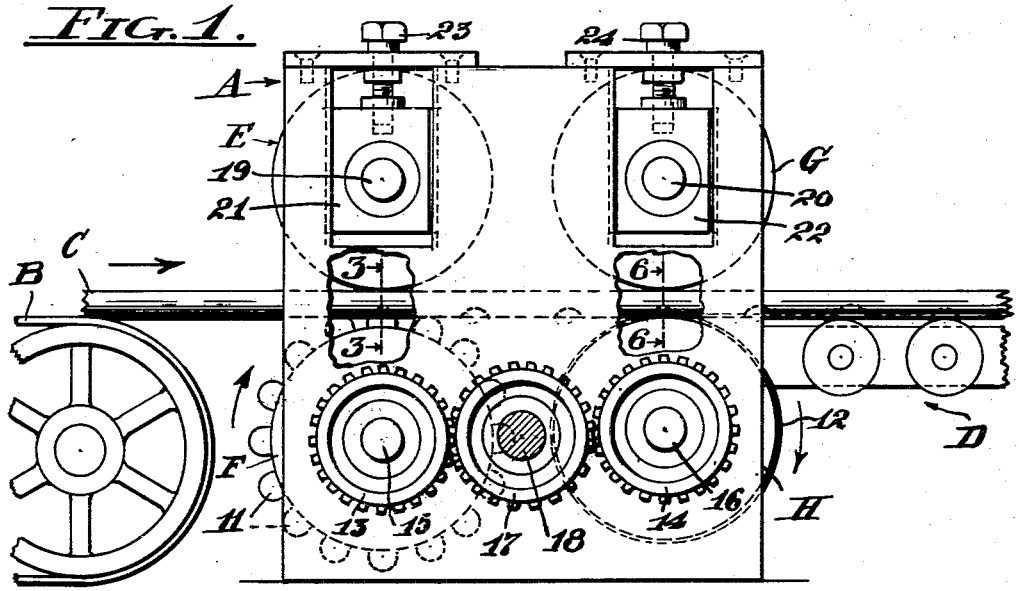
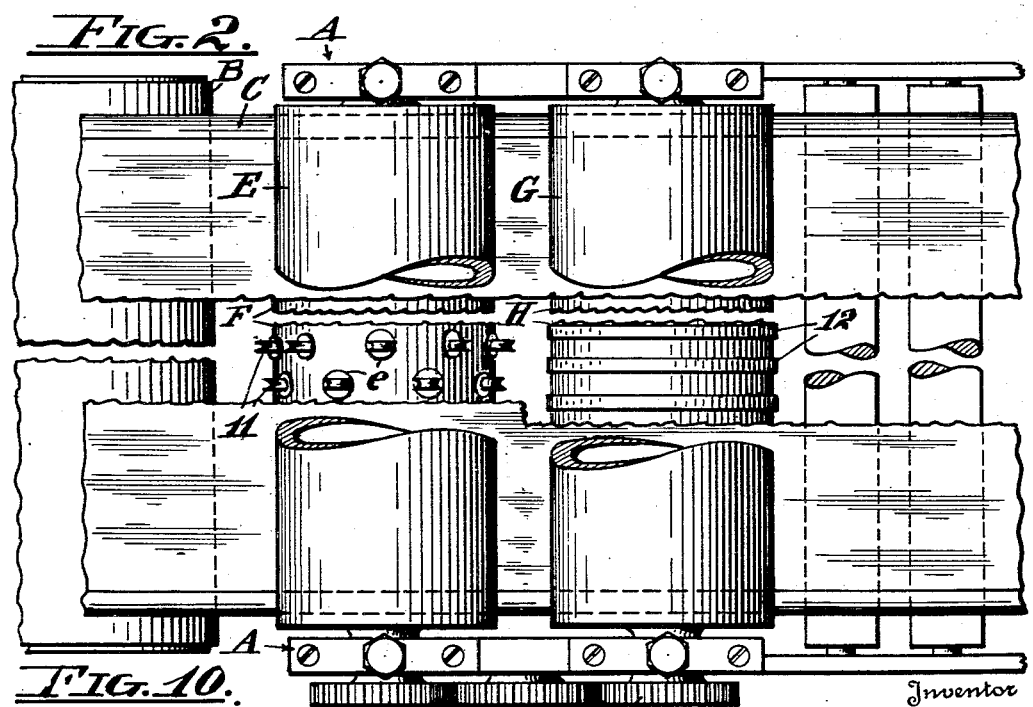
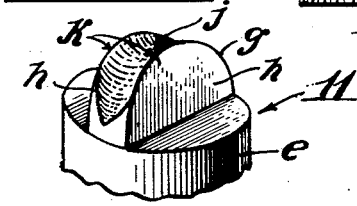

2,708,300

MACHINE FOR FORMING PLASTER KEYING DEPRESSIONS IN PLASTERBOARD

George A. Buttress, Los Angeles, Calif.

Application August 3, 1951, Serial No. 240,242

1 Claim. (Cl. 25—44)

This invention relates to a machine for forming plaster keying recesses or depressions in plasterboard and has as its primary object the provision of a mechanism which is applicable to conventional plasterboard manufacturing machinery producing and advancing a ribbon of plasterboard comprising a plastic layer interposed between paper facing sheets of cardboard or the like, to form on one side of the board at the stage of manufacture thereof when the plastic layer is soft and wet and immediately before setting thereof, and when the facing sheets are moist, a plurality of depressions which are shaped and dimensioned to provide for reliable keying and bonding to the board of plaster applied thereover as when the board is mounted upon a wall or ceiling.

A particular object is to provide a machine of the above character in which the plaster receiving depressions are formed in the plasterboard ribbon while the latter is being advanced on a conveyor immediately after formation thereof by the action of rolling dies and a contoured roller so constructed and operated as to impart a dovetailed cross section to the depressions.

Another object of the invention is to provide a construction in the depression forming die whereby on being rolled in and out of engagement with one of the facing sheets of a plasterboard while the plaster layer and the facing sheet are soft and wet, will shear from the facing sheet a strip portion thereof without severing the ends of said strip portion from the sheet and then depressing the strip portion and displacing portions of the soft plaster body to form a depression which has its bottom transversely arched and covered by said strip portion whereby there will be provided reinforcing factors which will compensate for the weakening effect of the depression and whereby the plasterboard may be formed with a multiplicity of closely arranged plaster receiving depressions without weakening the board.

A further object is to provide a mechanism whereby the plasterboard is formed with a multiple of longitudinally extending shallow corrugations with plaster receiving depressions in the ribbed portions of the corrugations.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a view in side elevation with portions broken away of the depression forming mechanism;

Fig. 2 is a plan view with portions removed;

Fig. 3 is an enlarged detail in section taken on the line 3—3 of Fig. 1 and depicting one of the recess or depression forming dies as engaged with the under side of a plasterboard panel in effecting formation of a plaster receiving depression in said panel;

Fig. 4 is a view in cross section taken on the line 4—4 of Fig. 3;

Fig. 5 is a detail in cross section of a fragmentary portion of the plasterboard similar to that shown in Fig. 4 with the depression forming die removed;

Fig. 6 is an enlarged detail in section taken on the line 6—6 of Fig. 1 depicting the action of a profiled roller in forming longitudinally extending ribs or corrugations on the plasterboard and for displacing portions of the plastic body of the board at the sides of the plaster receiving depressions to impart a dove-tail cross section to the latter;

Fig. 7 is a detail in section taken on the line 7—7 of Fig. 6 illustrating the manner of forming a rib surface on the plasterboard and at the same time imparting a dove-tailed cross section to the plaster receiving depression therein;

Fig. 8 is a detail in cross section of a fragmentary portion of the plasterboard shown in Fig. 7 with the contoured roller removed;

Fig. 9 is a perspective view of a fragmentary portion of the plasterboard showing the ribbed face thereof and a group of the plaster receiving depressions as formed therein; and Fig. 10 (Sheet one) is a perspective view of one of the die members.

Referring to the drawings more specifically A—A indicates a pair of standards or end plates embodied in the machine which is disposed at the discharge end of a conveyor belt B from which is delivered a horizontal ribbon of plasterboard C and directed between the standards A—A onto a roller conveyor D by means of which the ribbon of plasterboard C is carried to a suitable cutoff mechanism. The plasterboard C comprises the usual plaster layer or body $a$ interposed between upper and lower facing sheets $b$ and $c$ formed of paper such as cardboard or similar sheet material; the lower facing sheet being turned around the longitudinal edges of the plastic body $a$ and lapped over and adhered to the margins of the upper facing sheet $b$ in the convention fashion. The plasterboard C thus formed is fed between the standards A—A while the plaster body $a$ thereof is wet and soft and quite plastic and while the facing sheets $b$ and $c$ are also wet with moisture absorbed from the plaster body $a$.

In carrying out the invention two pair of superimposed rollers E—F and G—H are journalled on the standards A—A to extend transversely of the ribbon of plasterboard C, with the rollers E and G bearing on the upper surface of the plasterboard to oppose upward movement thereof. Roller F is disposed directly beneath the roller E with its outer periphery slightly spaced from the under side of the plasterboard C covered by the facing sheet $c$ and is provided on its outer periphery and throughout the length thereof with a series of circumferentially extending rows of spaced depression forming dies 11 having arcuate outer ends adapted to puncture the lower facing sheet $c$ to form spaced rows of spaced depressions $d$ in the plaster body $a$.

The dies 11, particularly shown in Fig. 10 each embodies a cylindrical body portion $e$ which is driven with a tight fit into circular openings $f$ formed in the wall of the roller F to effect mounting of the dies on the roller as shown in Figs. 3 and 4. Projecting outwardly from the body portion $e$ is the depression forming portion of the die which comprises an arcuate extension $g$ having parallel flat side faces $h$—$h$ and a groove $j$ on its perimeter flanked by sharp edged margins constituting fixed spaced arcuate blades $k$—$k$ for serving a strip portion $l$ from the facing sheet $c$ without severing the ends of the strip portion from the sheet; the side faces $h$—$h$ forming the outer faces of the blades. The bottom of the groove $j$ is transversely arcuate and serves to impart a transversely arched formation to the severed strip $l$ as the latter is depressed into the plaster body $a$ to form the bottom of the depression d formed by the die. The flat side faces h—h of the die initially form the depressions d with parallel sides m—m extending through the facing sheet c and into the plaster body a, as shown in Fig. 5.

The dies 11 are arranged on the roller F with their arcuate extensions g leading circumferentially of the roller so as roll along the lengths of the blades k—k in moving in and out of engagement with the plasterboard as the roller F revolves.

The roller H is spaced a short distance from the roller F and extends parallel thereto transversely of the under side of the ribbon of plasterboard C directly beneath the roller G. The roller H has formed thereon and throughout the length thereof a series of spaced circumferentially extending ribs 12 arranged in offset relation to the rows of dies on the roller F for engagement with the facing sheet c and to depress the latter between adjacent rows of depressions previously formed by the dies 11, and to provide longitudinal shallow ribs n and grooves o on the plasterboard in facing sheet c. The depressions d are thus arranged in the ribs n and the grooves o extend between adjacent rows of the depressions d as particularly shown in Fig. 9.

The groove forming ribs 12 on the roller H also act while producing the grooves o to compress the plaster body a opposite the grooves and at the same time displace portions of the plaster body opposite the ribs n so as to displace the portions of the plaster body a constituting the part of the side walls of the depressions d contiguous the facing sheet c and squeeze such portions slightly outward into the depressions to form projecting plaster ledges p as shown in Figs. 7 and 8 thereby imparting a general dove-tail cross section to the depressions d so as to effect keyed engagement with plaster applied to the ribbed face of the plasterboard.

The rollers F and H are positively driven in the direction of advance of the ribbon of plasterboard and for this purpose are here shown as fitted respectively with toothed wheels 13 and 14 fixed on shafts 15 and 16 on which the rollers F and H are mounted, and with which wheels 13—14 is meshed a drive pinion 17 on a shaft 18 driven under control from a suitable source of power.

The rollers E and G are fixed respectively on shafts 19 and 20 revolubly mounted in bearing blocks 21 and 22 which are adjustable vertically on the standards A—A by means of screws 23 and 24 in a usual manner to regulate the bearing of the rollers E and G against the plasterboard.

In the operation of the invention the rollers F and H are driven at corresponding uniform peripheral speeds and corresponding to the lineal speed of the conveyor belt B and the ribbon of plasterboard C advanced thereon; the rollers F and H moving at their upper peripheral portions in the direction of movement of the plasterboard which as before stated is soft and wet as it passes between the pairs of rollers E—F and G—H so as to be readily deformable. As the roller H rotates the dies 11 thereon roll in and out of engagement with the underside of the plasterboard and in so doing form spaced rows of spaced depressions d therein as previously described and as shown in Fig. 5 whereupon and almost immediately thereafter the roller H comes into play and acts as before stated to corrugate the surface of the facing sheet c and form the projecting plaster ledges p along the parallel side margins of the depressions d as shown in Fig. 8.

The ribbon of plasterboard on leaving the rollers G—H is advanced on the conveyor D to a suitable cut-off mechanism and reduced to panels of predetermined lengths which are subsequently dried and packaged in readiness for use.

It will now be seen that by employment of the depression forming mechanism as herein set forth, it is possible to rapidly and economically produce a plurality of keying depressions at intervals throughout one face of a strip or sheet of plasterboard together with a series of shallow parallel ribs or corrugations, in a continuous operation, and to produce a plasterboard which may be utilized as a lath as well as a wall-board and when used as a lath will afford a surface to which plaster will readily adhere and will be readily bonded by the keying depressions.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a machine for forming plaster-keying depressions in plasterboard of the type embodying a plaster body interposed between paper facing sheets at the stage of manufacture thereof when the plaster body is soft and wet and the facing sheets are moist, a horizontal roller having a series of spaced circumferentially extending rows of spaced dies protruding from the periphery thereof, each of said dies embodying an arcuate extension having flat parallel side faces extending circumferentially of the roller and terminating in spaced parallel arcuate paper cutting blades, means revolubly supporting said roller contiguous one side of a strip of plasterboard transversely thereof, means opposite said roller bearing on the plasterboard strip, means for driving said roller and thereby rolling the dies on said roller in and out of engagement with the plasterboard strip and forming spaced rows of spaced depressions therein, said blades serving to sever the contiguous facing sheet and adjacent portions of the plaster body and to form the depressions with parallel side marginal portions, and a second roller parallel to and adjacent said first named roller having circumferential ribs arranged to bear on the plasterboard and force portions of the plaster thereof into the outer portions of the depressions formed by said dies.

References Cited in the file of this patent

UNITED STATES PATENTS

| | | |
|---|---|---|
| 869,638 | Mayhew | Oct. 29, 1907 |
| 1,589,569 | Schumacher | June 22, 1926 |
| 1,844,144 | Buttress | Feb. 9, 1932 |
| 1,945,306 | Dean | Jan. 30, 1934 |
| 2,479,207 | Buttress | Aug. 16, 1949 |